United States Patent
Soga

[19]

[11] Patent Number: 5,119,358
[45] Date of Patent: Jun. 2, 1992

[54] DISK-CASSETTE LOADING MECHANISM

[75] Inventor: Ryo Soga, Tokyo, Japan

[73] Assignee: Sony Corporation, Japan

[21] Appl. No.: 492,918

[22] Filed: Mar. 13, 1990

[30] Foreign Application Priority Data

Mar. 31, 1989 [JP] Japan ................... 1-80468

[51] Int. Cl.$^5$ ..................... G11B 33/02; G11B 17/04
[52] U.S. Cl. .................. 369/77.2; 369/75.1; 369/75.2; 369/77.1; 360/99.06
[58] Field of Search ............... 369/77.1, 77.2, , 75.2, 369/75.1; 360/99.02, 99.03, 99.06

[56] References Cited

U.S. PATENT DOCUMENTS

| 4,707,819 | 11/1987 | Ehara | 369/77.2 |
| 4,737,871 | 4/1988 | Saito | 369/77.2 X |
| 4,746,013 | 5/1988 | Suzuki et al. | |
| 4,786,998 | 11/1988 | Sugawara et al. | 369/77.2 X |
| 4,807,215 | 2/1989 | Hishinuma | 369/77.2 |

FOREIGN PATENT DOCUMENTS

| 0156569 | 10/1985 | European Pat. Off. . |
| 0250111 | 12/1987 | European Pat. Off. . |
| 0293150 | 11/1988 | European Pat. Off. . |
| 62-281155 | 12/1987 | Japan . |
| 63-71975 | 4/1988 | Japan . |

Primary Examiner—Stuart S. Levy
Assistant Examiner—Tien Ba Pham
Attorney, Agent, or Firm—Ronald P. Kananen

[57] ABSTRACT

In a disk-cassette loading mechanism having such cassette withdrawing means as to be engaged with an inserted disk cassette to automatically withdraw the inserted disk cassette into a predetermined position, the cassette withdrawing means can be disengaged from the disk cassette to easily draw out the cassette from the mechanism when the disk cassette is drawn by hand in opposition to a direction for withdrawing the disk cassette after an engaging portion of the cassette withdrawing means is engaged with an engaged portion of the inserted disk cassette.

4 Claims, 14 Drawing Sheets

DISK-CASSETTE LOADING MECHANISM

BACKGROUND OF THE INVENTION

1. Field of the Invention

This invention relates to a disk-cassette loading mechanism, which has cassette withdrawing means to be engaged with an inserted disk cassette, and automatically withdraw it into a predetermined position.

2. Description of the Prior Art

Disclosed in Japanese Laid Open Patent No. 63-71975 is a disk-cassette loading mechanism, in which an engaging convex tip of a cassette withdrawing arm is engaged with an engaged recess of the disk cassette when a disk cassette is inserted toward a disk drive, and then, the cassette withdrawing arm is moved in a direction for withdrawing the disk cassette by the help of cam means driven by a motor. Thus, the disk cassette is located in the cassette loading position.

In such disk-cassette loading mechanism, the inserted disk cassette is withdrawn into the mechanism and automatically loaded in the cassette loading position, but the disk cassette can not be drawn out from the mechanism without depending upon a regular ejecting operation, after the motor begins to rotate.

In the meantime, it is often desired to change an inserted-disk cassette to another one in the course of inserting the disk cassette into the mechanism, so that the above disk-cassette loading mechanism will be inconvenient for use.

OBJECTS AND SUMMARY OF THE INVENTION

Accordingly, it is an object of the present invention to provide a disk-cassette loading mechanism in which an engaging portion of cassette withdrawing means for automatically withdrawing an inserted disk cassette into a predetermined position is easily disengaged from an engaged portion of the disk cassette when the disk cassette is drawn in opposition to a direction for withdrawing the disk cassette, even though the engaging portion of the cassette withdrawing means has been engaged with the engaged portion of the inserted disk cassette.

Another object of the invention is to provide a disk-cassette loading mechanism in which a moment is exerted on a cassette withdrawing means so as to rotate the cassette withdrawing means in a direction for pushing a disk cassette, so that the disk cassette is surely withdrawn into a predetermined position, and not disengaged from the cassette withdrawing means during the cassette loading operation, and when the disk cassette is drawn in opposition to a direction for withdrawing the disk cassette after an engaging portion of the cassette withdrawing means is engaged with an engaged portion of the disk cassette, a moment for disengaging the cassette withdrawing means from the disk cassette is exerted on the cassette withdrawing means, so that the cassette withdrawing means is easily disengaged from the disk cassette.

A further object of the invention is to provide a disk-cassette loading mechanism in which the power of driving means for driving cassette withdrawing means is obtained from a tension spring or the like so as to make the driving means simple.

Still a further object of the invention is to provide a disk-cassette loading mechanism in which a command signal for withdrawing a disk cassette is given from an inserted disk cassette so as to be prevented from the automatic withdrawal of the disk cassette with a bad timing.

Still another object of the invention is to provide a disk-cassette loading mechanism in which a start command signal for automatic withdrawal of an inserted disk cassette is given from shutter opening and shutting means, by which a shutter is opened as the disk cassette is inserted on the one hand, and the shutter is shut, and simultaneously, the disk cassette is ejected on the other hand, so that the mechanism can be put in action with a good timing, and becomes simple in structure.

Still another object of the invention is to provide a disk-cassette loading mechanism in which the operation of lowering a disk cassette from the upper position to the lower position thereof so as to make a disk accommodated in the disk cassette mount on a turntable and face reader means after the disk cassette is automatically withdrawn into a predetermined position by cassette withdrawing means, is conducted only by both driving means for driving the cassette withdrawing means, and a slider which is driven by the driving means, so that the mechanism is put in action with a good timing, and becomes simple in structure.

In accordance with an aspect of this invention, in a disk-cassette loading mechanism having cassette withdrawing means to be engaged with an inserted disk cassette and withdraw it automatically into a predetermined position, the cassette withdrawing means is so provided as to be rotatable on a pivot which is provided in driving means; first urging means for urging the cassette withdrawing means rotates the cassette withdrawing means in a direction for engaging an engaging portion of the cassette withdrawing means with an engaged portion of the disk cassette; the pivot driven by the driving means is moved in a direction for withdrawing the inserted disk cassette so as to automatically withdraw the disk cassette into a predetermined position after the engaging portion of the cassette withdrawing means is engaged with the engaged portion of the disk cassette; and disengaging means for disengaging the engaging portion of the cassette withdrawing means from the engaged portion of the disk cassette is provided so as to rotate the cassette withdrawing means against the force of the first urging means by a force exerted on the cassette withdrawing means, when the disk cassette is drawn in opposition to the direction for withdrawing the inserted disk cassette after the engaging portion of the cassette withdrawing means is engaged with the engaged portion of the disk cassette.

In a preferred embodiment of this invention, the disengaging means comprises a stop which abuts a part of the cassette withdrawing means to forcibly rotate the cassette withdrawing means against the force of the first urging means. A moment of a contact force produced between the engaging portion of the cassette withdrawing means and the engaged portion of the disk cassette is exerted on the cassette withdrawing means so as to rotate the cassette withdrawing means in a direction for pushing the disk cassette when the engaging portion of the cassette withdrawing means is engaged with the engaged portion of the disk cassette to move the pivot in the direction for withdrawing the disk cassette, and when the disk cassette is drawn in opposition to the direction for withdrawing the disk cassette after the engaging portion of the cassette withdrawing means is engaged with the engaged portion of the disk cassette, a moment which is in opposition to the moment caused by the contact force is exerted on the cassette withdrawing means due to contact of the cassette withdrawing means with the disengaging means, so that the cassette withdrawing means is rotated in a direction for being disengaged from the disk cassette.

Moreover, in the cassette loading mechanism, the driving means is so provided as to be rotatable on a shaft; second urging means for rotatively urging the driving means is provided to move the pivot in the direction for withdrawing the disk cassette; locking means is provided to lock the driving means in a position from which the driving means begins to withdraw the cassette withdrawing means; and when the driving means is unlocked, the pivot, which is integral with the driving means, is moved in the direction for withdrawing the disk cassette due to force of the second urging means. The driving means is unlocked due to motion of the locking means which is caused by a push given by the inserted disk cassette, and it is substantially simultaneous with the engagement of the cassette withdrawing means with the disk cassette. Further, shutter opening and shutting means is provided to open a shutter, which is secured to the disk cassette, as the disk cassette is inserted, and shut the shutter on the one hand and push out the disk cassette on the other hand as the disk cassette is ejected; and the engaged portion of the disk cassette is engaged with the engaging portion of the cassette withdrawing means and substantially at the same time, the locking means is moved by the shutter opening and shutting means in a direction for unlocking the drive means.

In addition, in the cassette loading mechanism, the cassette withdrawing means is so provided as to be rotatable on the pivot which is provided in the driving means; the first urging means for urging the cassette withdrawing means rotates the cassette withdrawing means in the direction for engaging the engaging portion of the cassette withdrawing means with the engaged portion of the disk cassette; the pivot driven by the driving means is moved in the direction for withdrawing the inserted disk cassette so as to automatically withdraw the disk cassette into the predetermined position after the into the predetermined position after the engaging portion of the cassette withdrawing means is engaged with the engaged portion of the disk cassette; the disengaging means for disengaging the engaging portion of the cassette withdrawing means from the engaged portion of the disk cassette is provided so as to rotate the cassette withdrawing means against the force of the first urging means by the force exerted on the cassette withdrawing means when the disk cassette is drawn in opposition to the direction for withdrawing the inserted disk cassette after the engaging portion of the cassette withdrawing means is engaged with the engaged portion of the disk cassette; and a slider is so provided as to be slidingly driven by the driving means to be lowered from the upper position to the lower position thereof while the driving means moves the pivot in the direction for withdrawing the disk cassette, so that in the lower position, a recording disk accommodated in the disk cassette is mounted on a turntable and simultaneously, faces a reader.

The above, and other objects, features and advantages of this invention, will be apparent from the following detailed description of illustrative embodiments thereof to be read in connection with the accompanying drawings wherein like reference numerals identify the same or corresponding parts in the several views.

DETAILED DESCRIPTION OF A PREFERRED EMBODIMENT

Referring to the drawings in detail, a disk-cassette loading mechanism embodying the present invention will be described.

Figure 1:
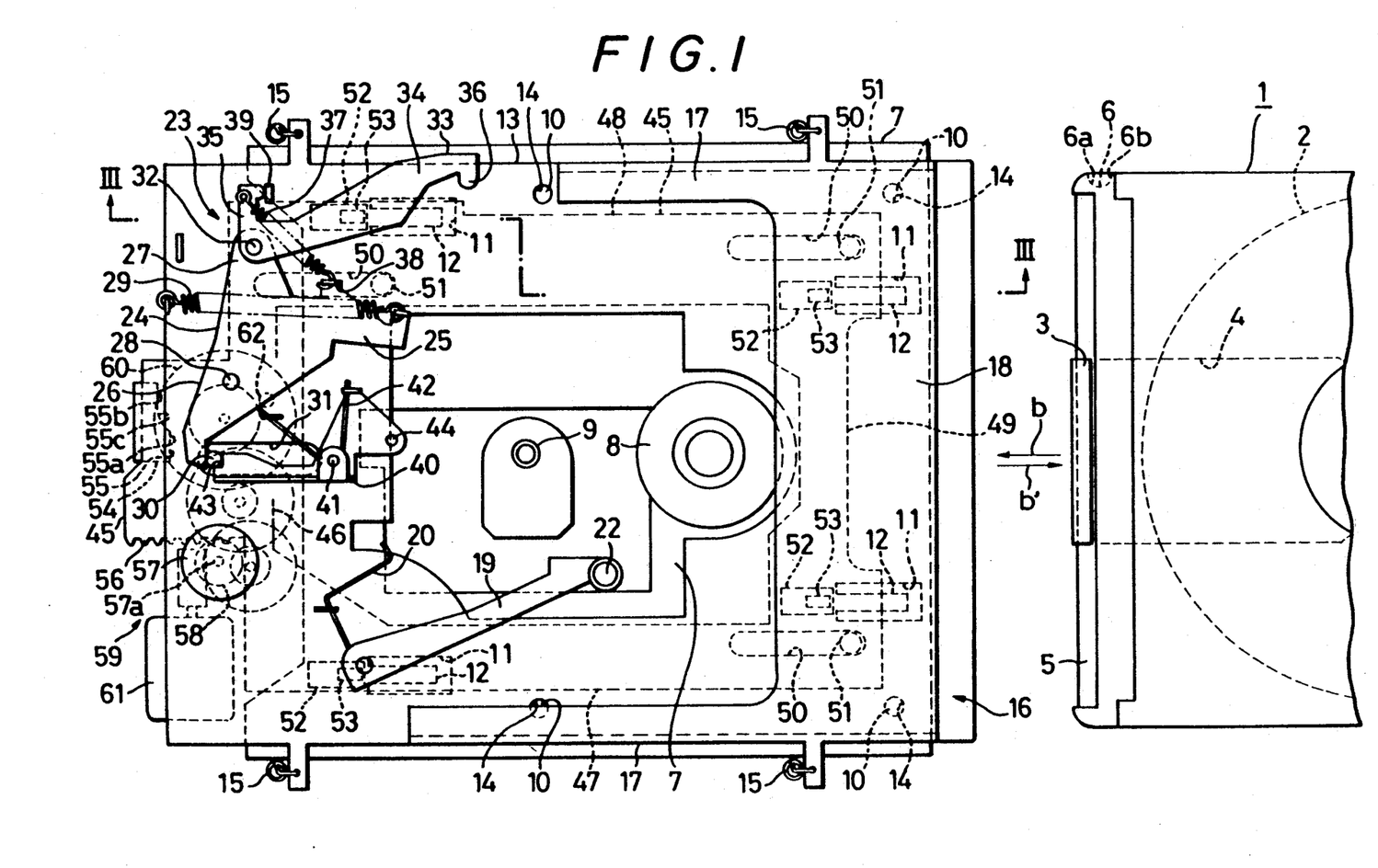
FIG. 1 is a plan view of a disk-cassette loading mechanism according to an embodiment of this invention.
Figure 5A:
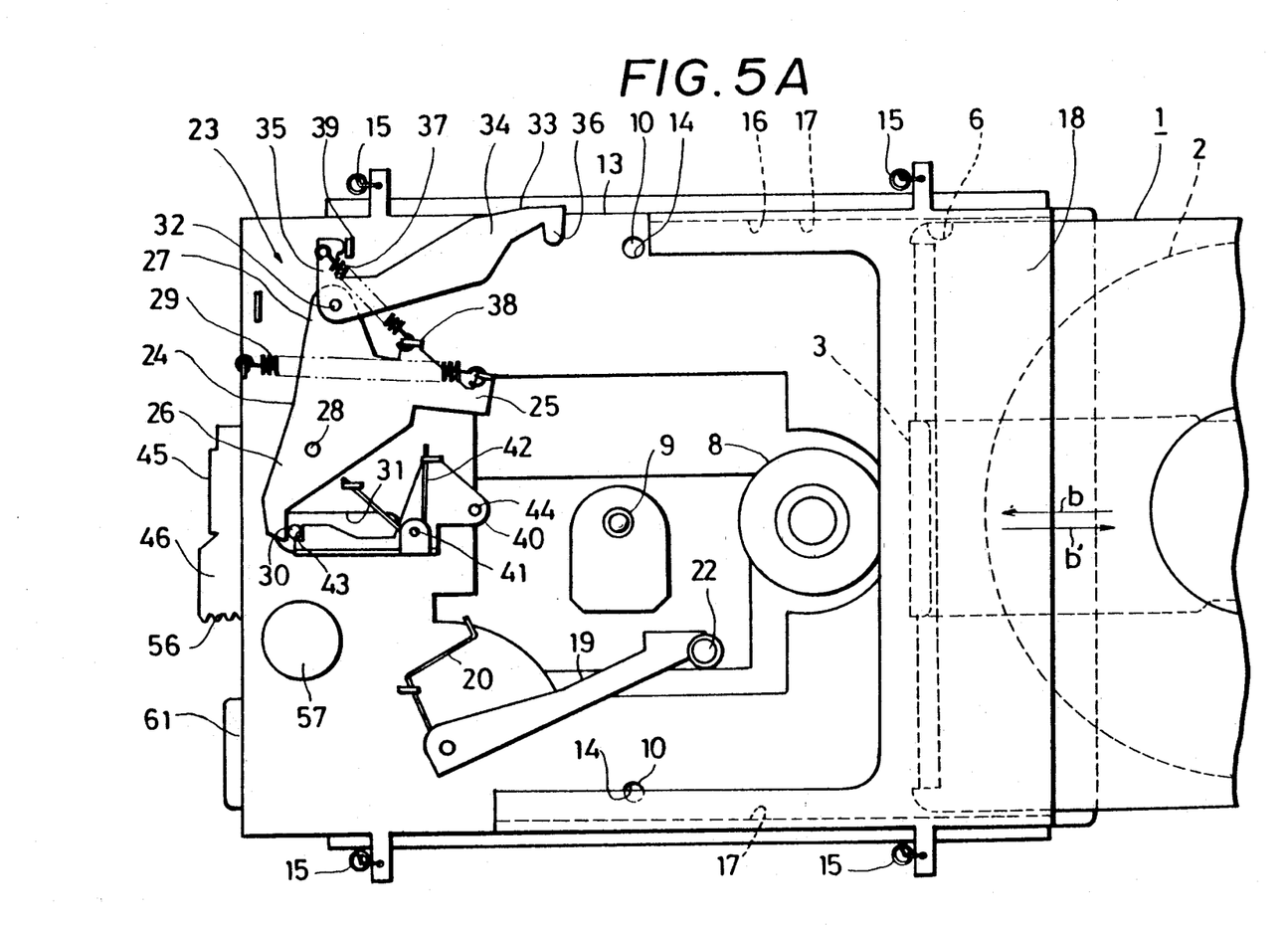
FIG. 5A to 5F are plan views for illustrating in turn the operation of the cassette loading mechanism of FIG. 1.
Figure 5B:
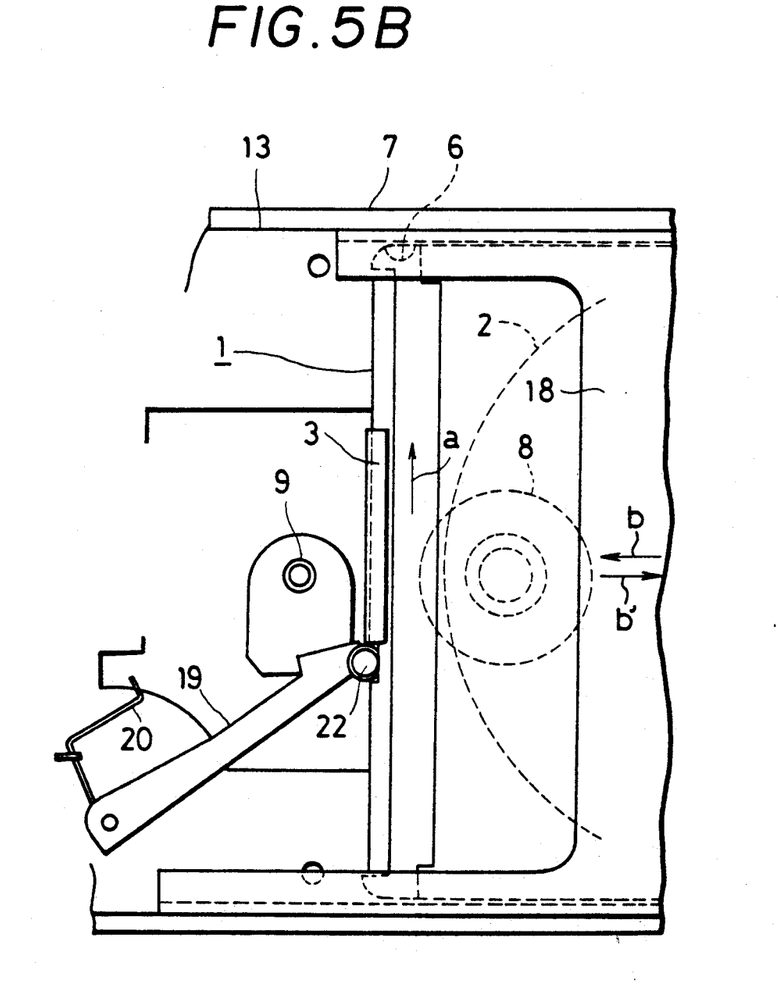
Figure 5C:
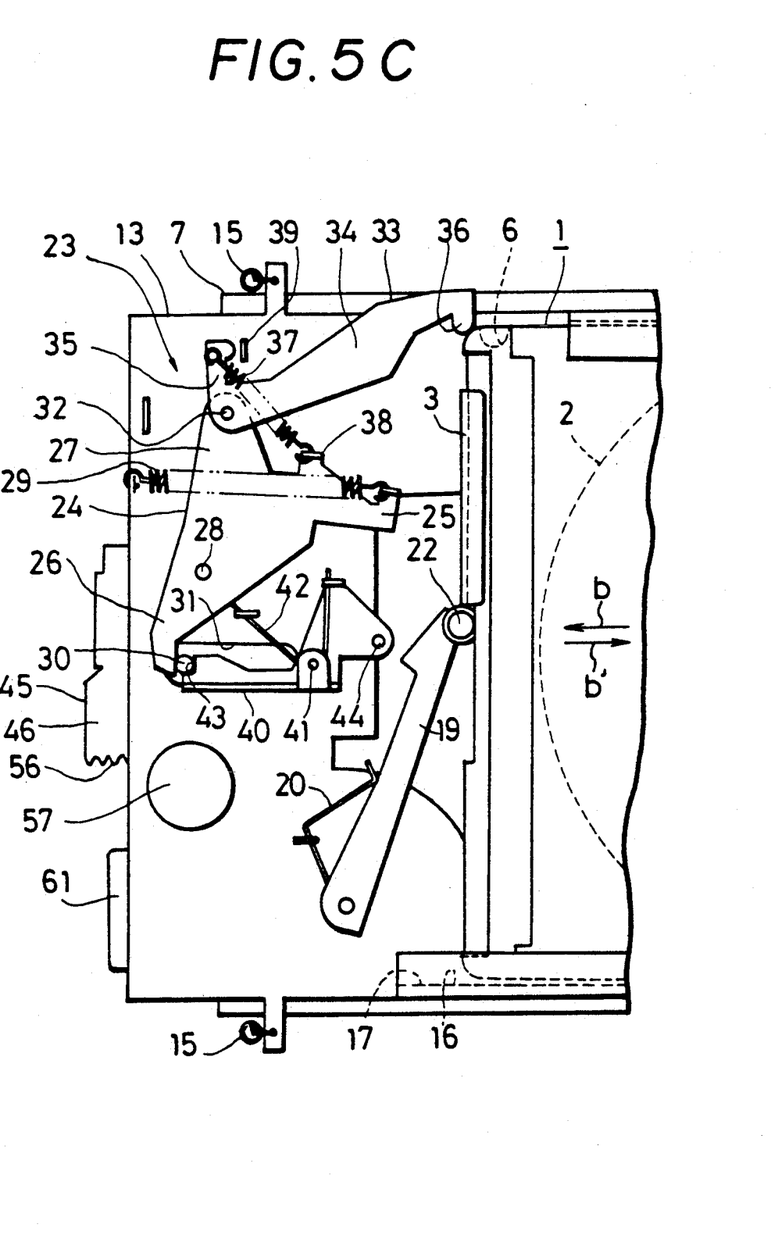
Figure 5D:
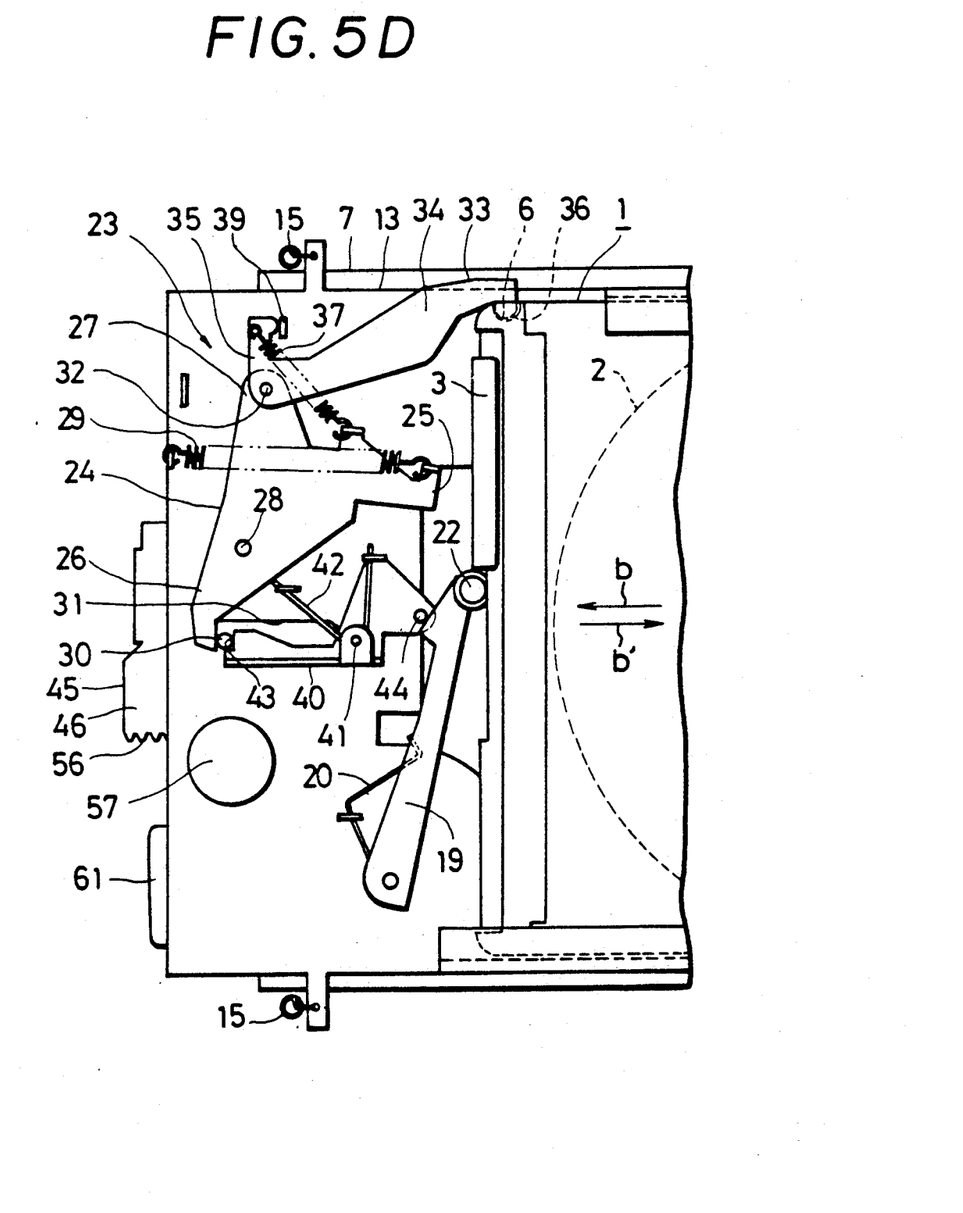
Figure 5E:
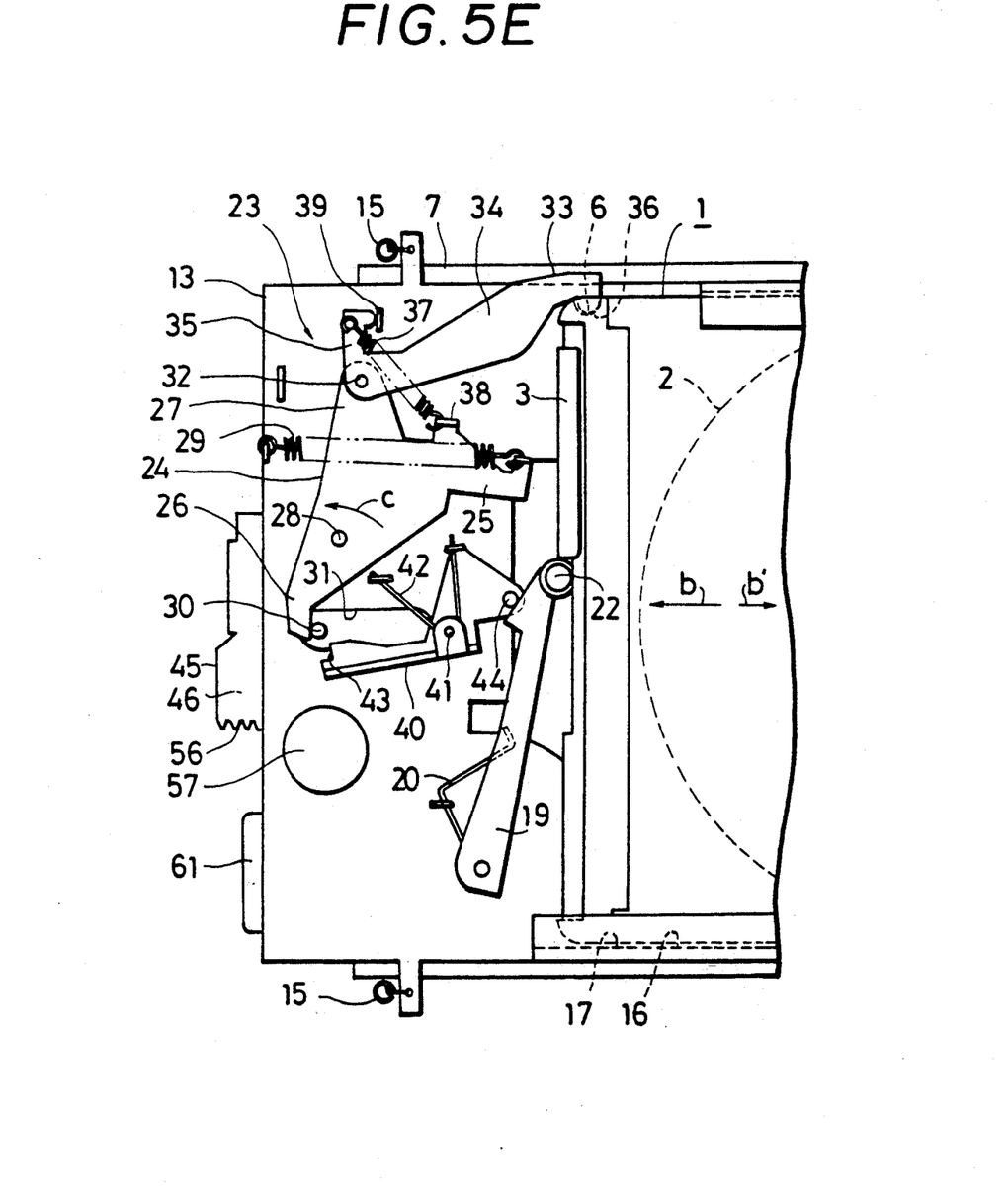
Figure 5F:
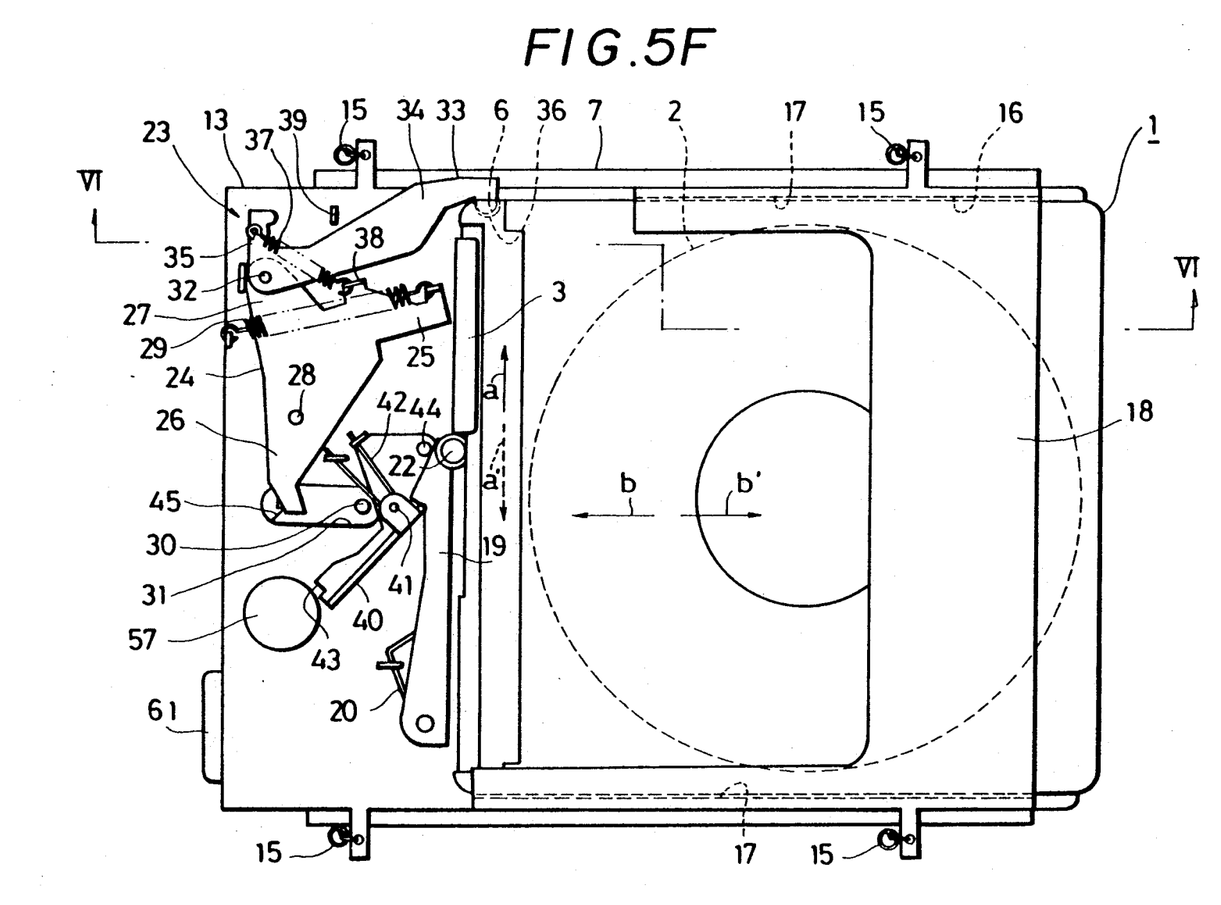

A disk cassette 1 supplied to the loading mechanism is of flat shape and accommodates a recording disk 2 as shown in FIG. 5F. A shutter 3 is slidably secured to one end of the disk cassette 1, and held in the shut position thereof by resilient means (not shown) as illustrated in FIG. 1. When the shutter 3 is moved to the open position thereof, an opening 4 provided in the bottom of the disk cassette 1 is opened, and through the opening 4, the recording disk 2 is exposed.

Reference numerals 5 and 6 in FIG. 1 denote a groove and a recess, respectively. A further detailed description of the disk cassette will be omitted, as there is hardly any point in relation to the subject matter of this invention; however, if necessary, see U.S. Pat. No. 4,746,013, for example.

As shown in FIG. 1, mounted on a chassis 7 of the disk-cassette loading mechanism are a turntable 8 on which the disk 2 is mounted so as to be turned, an optical reader 9 for reading information from the disk 2, and so forth. Four guide pins 10 which uprightly project from the chassis 7 are fitted into respective insertion holes 14 provided in a cassette table 13, so that the cassette table 13, which is horizontally positioned in parallel with the chassis 7, is movable to be approached to, and separated from the chassis 7 along the guide pins 10. Further, four tension springs 15 are stretched between the chassis 7 and the cassette table 13 so that the cassette table 13 may be urged in a direction toward the chassis 7. It is noted that the cassette table 13 is substantially a box frame (FIG. 1).

Figure 3:
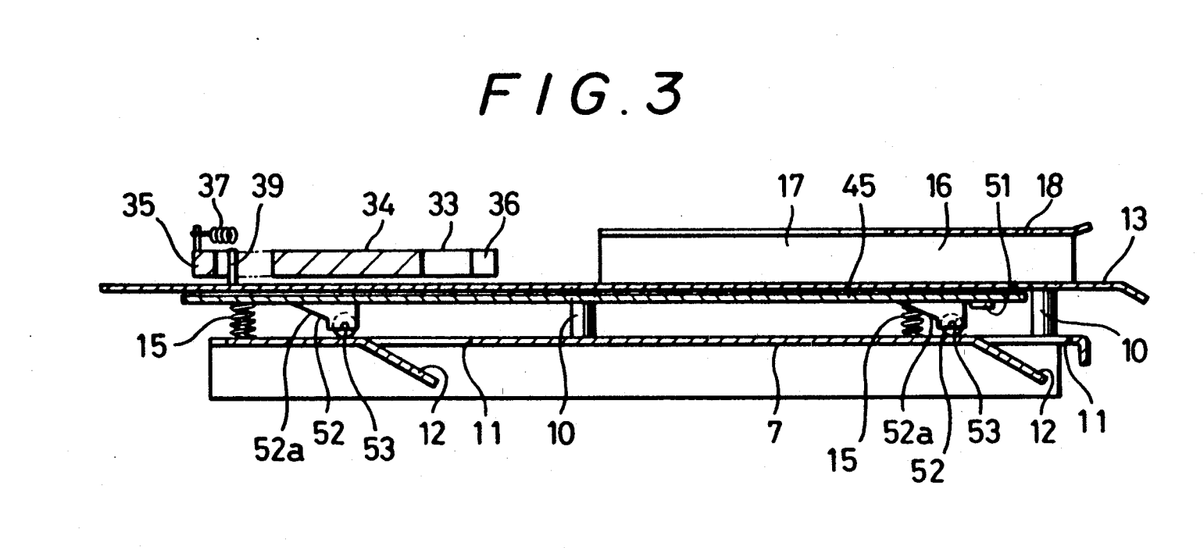
FIG. 3 is a sectional view on an enlarged scale and taken along the line III—III on FIG. 1.

As shown in FIG. 3 and 1, between the chassis 7 and the cassette table 13, there is placed a slider 45 which is substantially a box frame comprising two longitudinal beams 47 and 48 and two cross beams 46 and 49, and is formed by press working of sheet metal. In the slider 45, there are three elongate holes 50 extending along the longitudinal beams 47 and 48, and in the elongate holes 50, three guide pins 51, which project downwards from the cassette table 13, are loosely fitted, respectively, and the free ends of the guide pins 51 are enlarged lest the guide pins 51 should come out. Thus, the slider 45 is slidable on the lower face of the cassette table 13 within a movable extent of the pin 51 in the elongate holes 50.

As shown in FIG. 3 and 1, the slider 45 has four brackets 52 on the lower face thereof to rotatably support respective rollers 53. The brackets 52 are made of synthetic resin, and the rear faces 52a of the brackets 52 are formed into a slope.

Figure 6:
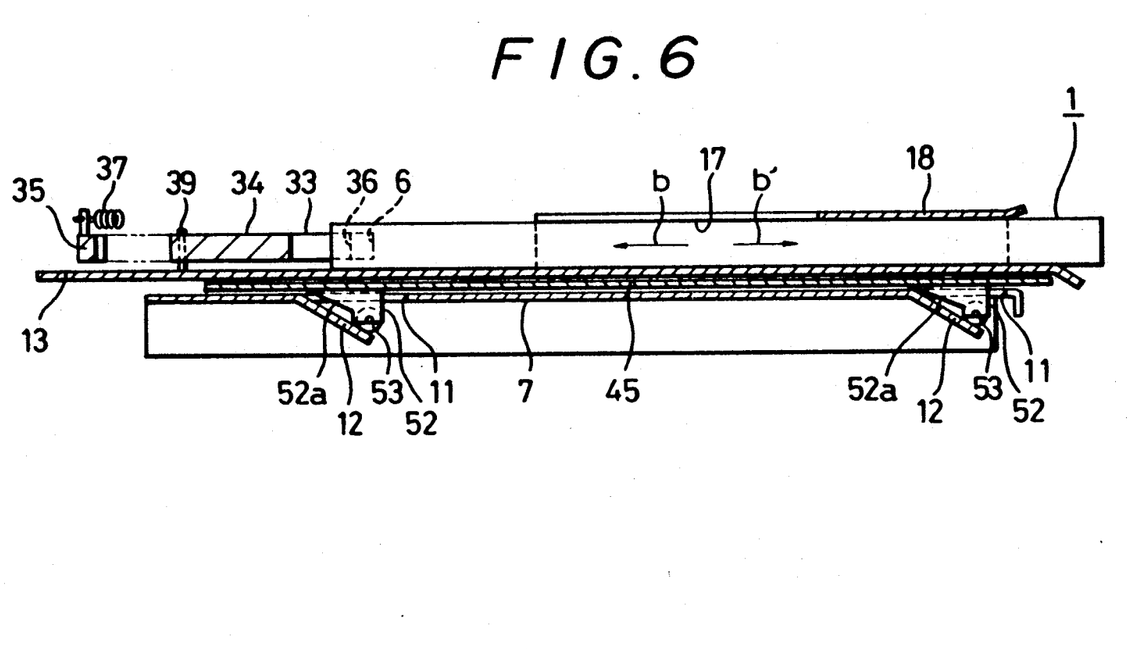
FIG. 6 is a sectional view taken along the line VI—VI on FIG. 5F.

The rollers 53 roll on the upper face of the chassis 7, and as shown in FIG. 6, can roll down on slopes 12 provided in the chassis 7. The slopes 12 are formed so as to be inclined downwards in respective elongate holes 11, which are provided in the chassis 7 (FIG. 1). Thus, when the rollers 53 are not on the slopes 12 (FIG. 3), the cassette table 13 mounted on the slider 45 is located in a first position which is spaced away upwards from the chassis 7, and when the rollers 53 are on the slopes as shown in FIG. 6, the cassette table 13 is located in a second position which is adjacent to the chassis 7.

Figure 2:
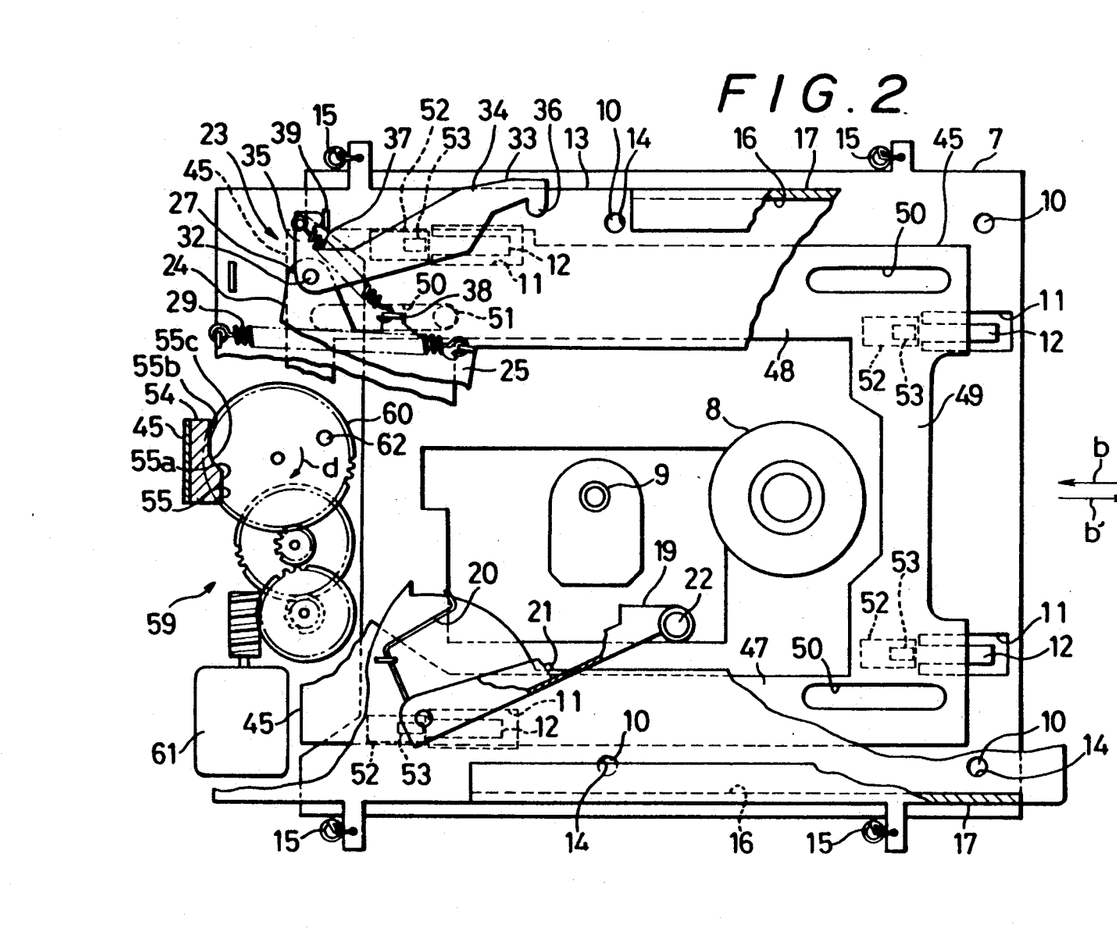
FIG. 2 is a plan view, partly broken away, of the disk-cassette loading mechanism of FIG. 1.

A cassette guiding portion 16 shown in FIG. 1 has a pair of right and left guide ways 17 which are connected with each other through a connecting plate 18, and are disposed on the upper face of the cassette table 13 to guide the disk cassette 1, which is supplied to the disk-cassette loading mechanism. A shutter opening lever 19 is rotatably secured to the upper face of the cassette table 13 at the proximal end thereof, and is urged clockwise in FIG. 1 due to force of a torsion spring 20 so far that the lever 19 abuts against a stop 21 (FIG. 2). In such position, the lever inclines inwardly as shown in FIG. 1. Further, a roller 22 is rotatably secured to the distal end of the lever 19.

A holding means for holding the cassette 1 comprises a cassette withdrawing arm 33 which has a convex tip 36 provided at the distal end of the arm portion 34 thereof and capable of engaging the recess 6 of the cassette 1, a cassette withdrawing lever 24 which is rotatably secured to the cassette table 13 and has a pivot 32, on which the cassette withdrawing arm 33 rotates, and a locking lever 40 for locking the cassette withdrawing lever 24.

The cassette withdrawing lever 24 is made of sheet metal, and substantially has the shape of the letter "T": a central projection 25, a right projection 27, and a left projection 26. The projections 26 and 27 are gradually widened toward the proximal end thereof, as if a gusset were inserted between the central projection 25 and each of the right and left projections 26 and 27. The lever 24 is rotatably supported in the intermediate position of the left projection 26 by a shaft 28 which projects from the upper face of the cassette table 13, and is urged counterclockwise in FIG. 1 by the force of a tension spring 29 which is stretched between the free end of the central projection 25 and the rear end of the cassette table 13. The free end of the left projection 26 of the cassette withdrawing lever 24 abuts against a pin 30 which projects upwards from the slider 45, and passes through a slot 31 which is provided in the cassette table 13.

The cassette withdrawing arm 33 has a projection 35 at the proximal end thereof, and is urged clockwise in FIG. 1 by the force of a tension spring 37, which is stretched between the free end of the projection 35 and a spring anchor 38 projecting from substantially the midst of the central projection 25, so far that the free end of the projection 35 abuts against a stop 39. The spring constant of the spring 29 is much larger than that of the spring 37.

The locking lever 40 is rotatably supported by a shaft 41 in the intermediate position thereof, and urged clockwise in FIG. 1 by the force of a torsion spring 42. The shaft 41 projects from the upper face of the cassette table 13.

At the rear end of the locking lever 40, there is a steplike notch 43, and at the forward end of the locking lever 40, there is a pin 44, which can abut the shutter opening lever 19. When the holding means 23 is in its initial position as shown in FIG. 1, the pin 30 is sandwiched between the free end of the left projection 26 of the cassette withdrawing lever 24 and the steplike notch 43 of the locking lever 40, and the cassette table 13 is in the first position thereof, because the rollers 53 of the slider 45 are not on the slopes 12 of the chassis 7.

Figure 4:
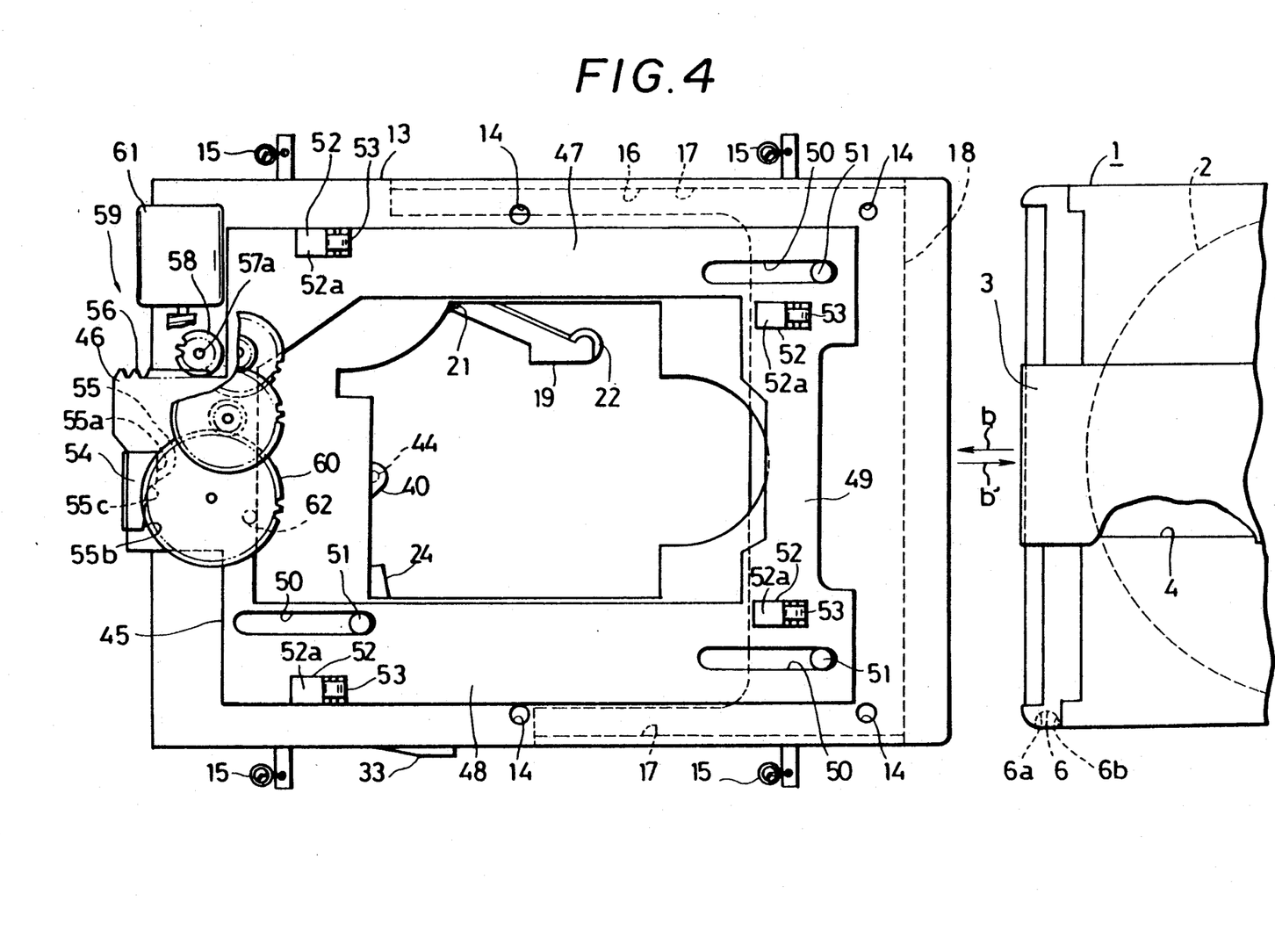
FIG. 4 is a bottom plan view, partly omitted, of the disk cassette loading mechanism of FIG. 1.

As shown in FIGS. 1 and 4, a damper 57 is secured to the cassette table 13, and a pinion 58 is secured to a shaft 57a which projects from the damper 57. The pinion 58 is meshed with a rack 56 which projects rearwards from the rear cross beam 46 of the slider 45.

As shown in FIGS. 1 and 2, an unloading mechanism 59 comprises a gear 60 which is rotatably supported by the cassette table 13, a motor 61 by which the gear 60 is driven, and an inverse cam means 54 which comprises an eccentric pin 62 projecting from the gear 60, and a cam face 55 provided in the slider 45. The cam face 55 comprises a first straight portion 55a, a second straight portion 55b, and an intermediate curved portion 55c.

The function of the disk-cassette loading mechanism will be hereinafter described. When loaded, the disk cassette 1 is inserted into the cassette guiding portion 16 of the cassette table 13 as shown in FIG. 5A, and at that time, the cassette table 13 is in the first position thereof. As the cassette 1 is advanced, the roller 22 of the shutter opening lever 19 is fitted into the groove 5 of the cassette 1 (FIG. 5B) to move the shutter 3 in a direction of arrow a. Soon after, the projection 36 of the cassette withdrawing arm 33 comes in contact with a corner of the cassette 1, and is pushed by the cassette 1, so that the arm 33 is rotated a little counterclockwise in FIG. 5C against the force of the tension spring 37, and abuts against a side of the cassette 1, which is parallel to the advance direction of the cassette 1. Then, the projection 36 of the cassette withdrawing arm 33 is fitted in the recess 6 of the cassette 1 (FIG. 5D), and simultaneously, the free end of the shutter opening lever 19 is abutted the pin 44 of the locking lever 40.

Due to successive rotation of the shutter opening lever 19, the locking lever 40 is rotated to disengage the steplike notch 43 thereof from the pin 30, so that the slider 45 and the cassette withdrawing lever 24 of the holding means 23 are unlocked (FIG. 5E). Thus, the cassette withdrawing lever 24 is rotated in the direction of arrow c in FIG. 5E due to force of the tension spring 29, and the pivot 32 is revolved around the shaft 28 to withdraw the cassette 1 in the direction of arrow b through the cassette withdrawing arm 33 (FIG. 5F).

On the other hand, the slider 45 is moved in the direction of arrow b' in relation to the cassette table 13 and the chassis 7, because the pin 30 of the slider 45 is pushed by the cassette withdrawing lever 24, so that the cassette table 13 descends to the second position thereof as shown in FIG. 6. When the cassette table 13 reaches the second position thereof, the shutter 3 is completely opened by the shutter opening lever 19. As the result, the disk 1 is mounted on the turntable 8, and the reader 9 faces the disk 1, so that the cassette loading operation is accomplished.

Figure 9:
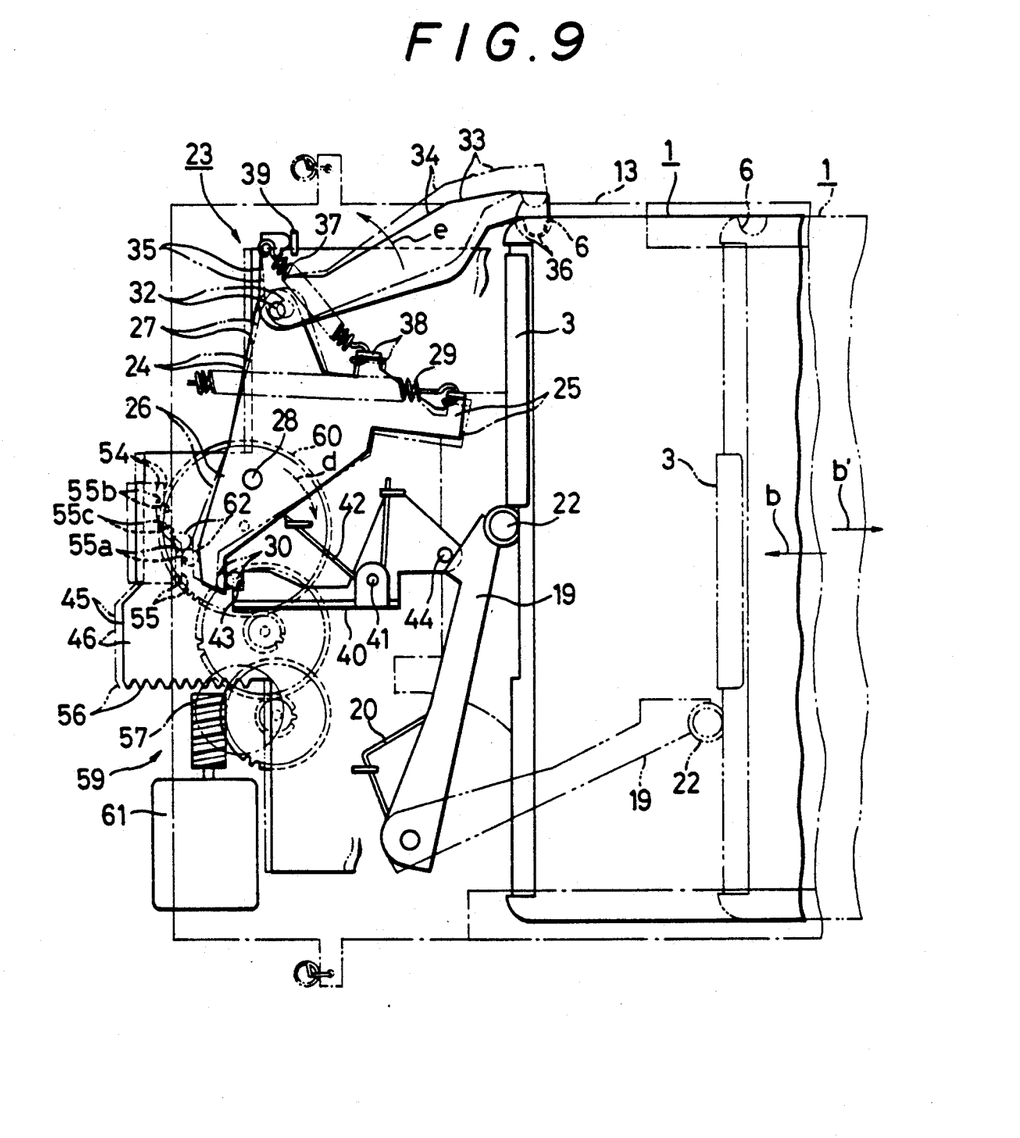
FIG. 9 is a schematic plan view for illustrating an operation of the disk-cassette loading mechanism of FIG. 1 at the time when the disk cassette is regularly unloaded.

When the cassette 1 is unloaded, the gear 60 is driven in a direction of arrow d in FIG. 2 in response to a command signal, and the eccentric pin 62 comes in contact with the first straight portion 55a of the cam face 55 as indicated in dotted lines in FIG. 9, and pushes the slider 45 in the direction of arrow b through the inverse cam means 54 of the slider 45. Thus, the slider 45 moves toward the position shown in FIG. 3, and the cassette table 13 is spaced away from the chassis 7.

At that time, the left projection 26 of the cassette withdrawing lever 24 is pushed by the pin 30 of the slider 45, so that the cassette withdrawing lever 24 is rotated clockwise in FIG. 9 to revolve the pivot 32 around the shaft 28, and thus, the disk cassette 1 is moved in a direction of arrow b' by the cassette withdrawing arm 33 which is driven by the pivot 32.

After the slider 45 is returned to the position shown in FIG. 1, the slider 45 passes the above position in a short distance due to contact of the pin 60 with the first straight portion 55a of the cam face 55, and thereby, the cassette withdrawing lever 24, which is pushed by the pin 30 of the slider 45, passes the position shown in FIG. 1 in a short distance, so that the free end of the projection 35 of the cassette withdrawing arm 33 is pushed against the stop 39 and the cassette withdrawing arm 33 is rotated in the direction of arrow e as indicated in two-dots-and-dash lines in FIG. 9. Thus, the convex tip 36 of the cassette withdrawing arm 33 is disengaged from the recess 6 of the disk cassette 1.

Thereafter, the disk cassette 1 is ejected by the shutter opening lever 19 which is urged by the torsion spring 20. The pin 30 of the slider 45 is engaged with the steplike notch 43 of the locking lever 40, because the eccentric pin 62 is disengaged from the cam face 55 of the inverse cam means 54, and returned to the position shown in FIG. 1.

Figure 7:
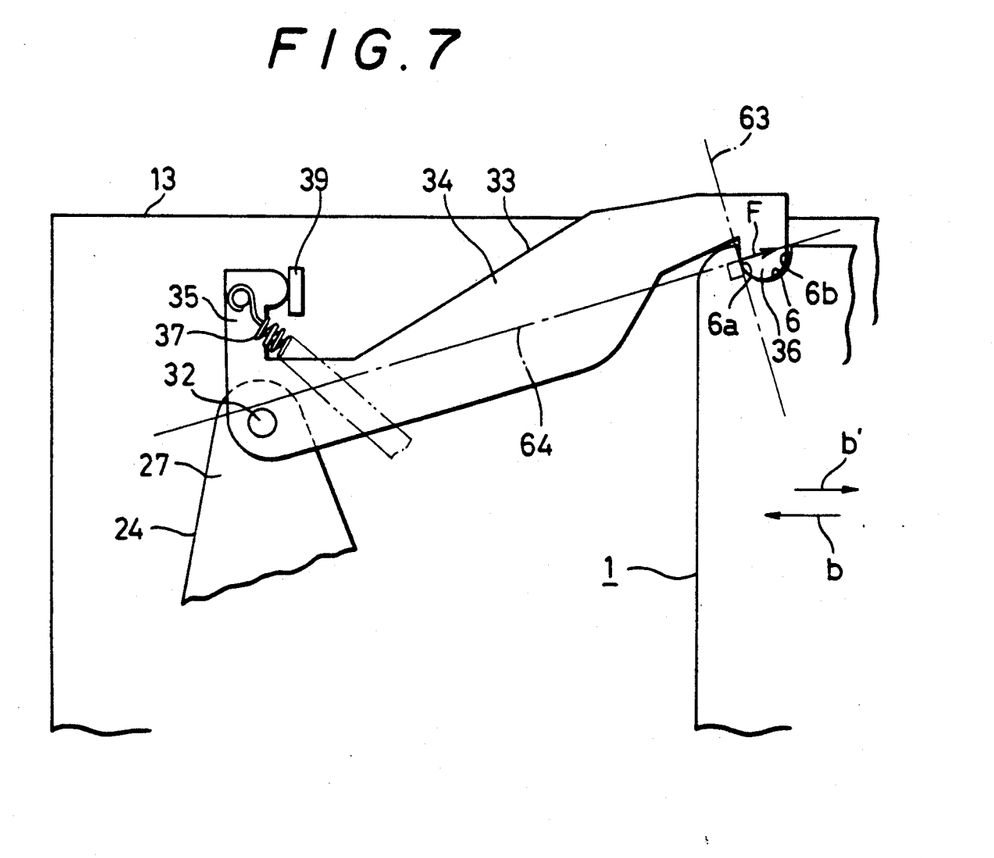
FIG. 7 is a schematic plan view for illustrating positional relationships among principal parts of the disk-cassette loading mechanism of FIG. 1.
Figure 8:
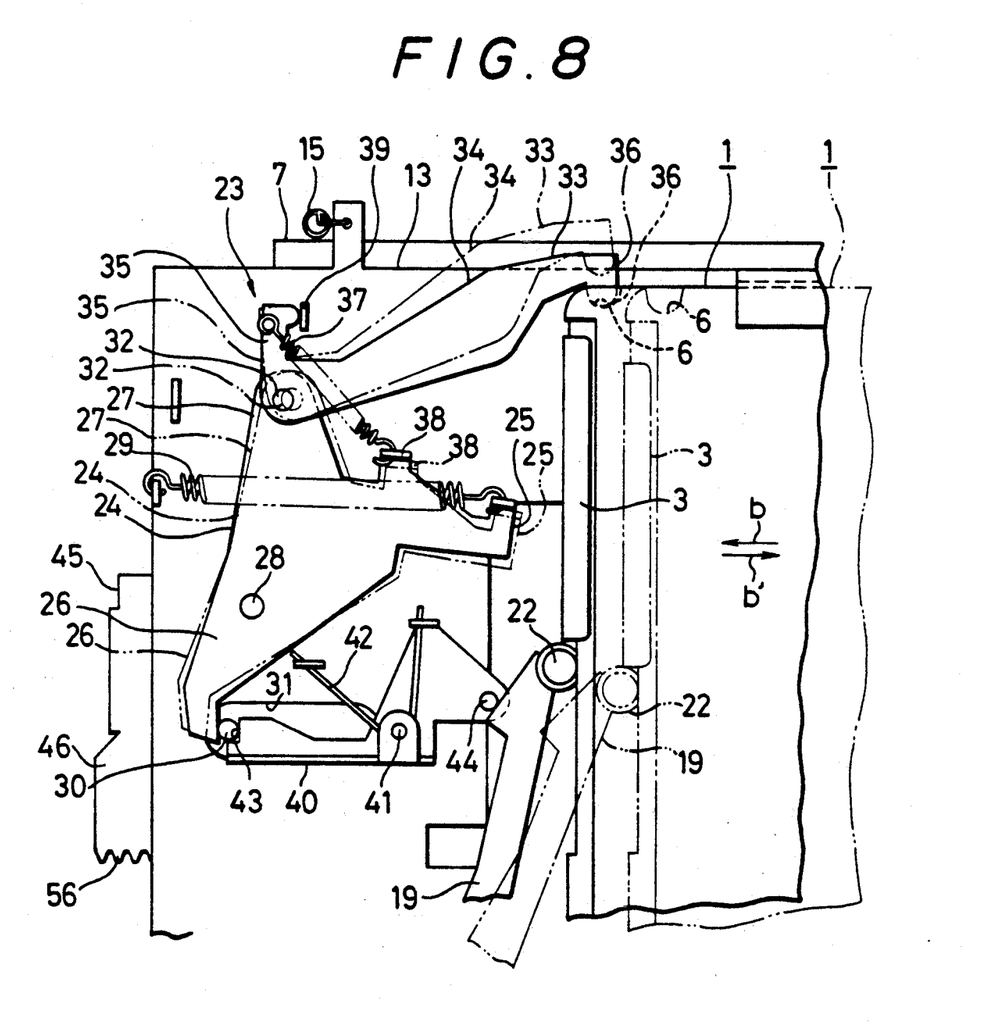
FIG. 8 is a schematic plan view for illustrating an operation of the disk-cassette loading mechanism of FIG. 1 at the time when the disk cassette is drawn out from the mechanism in opposition to a direction for withdrawing the disk cassette.

In the meantime, when the convex tip 36 of the cassette withdrawing arm 33 is engaged with the recess 6 of the disk cassette 1 as shown in FIG. 7, and thereafter, the cassette withdrawing arm 33 is withdrawn in the direction of arrow b, a contact force F is produced at a contact point of the rear side face 6a of the recess 6 with the convex 36. If the tangent line 63 and the normal 64 are drawn at the contact point, the normal 64 coincides with the line of action of the contact force F, and if the pivot 32 of the cassette withdrawing arm 33 is not on a side, near to the center of the mechanism, of the normal 64, the convex 36 is easily disengaged from the recess 6, because a moment of the contact force F is exerted on the cassette withdrawing arm 33 counterclockwise in FIG. 7. However, in this invention, the pivot 32 is on the side, near to the center of the mechanism, of the normal 64, so that the convex tip 36 is not disengaged from the recess 6 during the withdrawal by the cassette withdrawing arm 33.

Moreover, in this invention, the stop 39 and the projection 35 of the cassette withdrawing arm 33 are provided besides, so that the disk cassette 1 can be drawn out from the mechanism even after the convex tip 36 is engaged with the recess 6, because the pivot 32 is moved in the direction of arrow b' when the disk cassette 1 is drawn by hand in the same direction, so that the cassette withdrawing lever 24 is rotated clockwise in FIG. 7 against the force of the tension spring 29, and after the projection 35 of the cassette withdrawing arm 33 abuts against the stop 39, the cassette withdrawing arm 33 is rotated counterclockwise in FIG. 7 against the force of the tension spring 37 to disengage the convex tip 36 of the cassette withdrawing arm 33 from the recess 6 of the disk cassette 1. It is noted that recess 6 has a pair of side faces 6a and 6b which form an angle of 15° with the central line thereof as shown in FIG. 2.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A disk cassette loading mechanism comprising:

a cassette withdrawing means (33) for engaging at least a portion of an inserted disk cassette (1) and for withdrawing it automatically into a predetermined position, wherein the cassette withdrawing means (33) for normally unloading said cassette from said mechanism and withdrawing said disk cassette during loading is so provided as to be rotatable on a pivot (32) which is provided in a driving means (24) for driving said withdrawing means for normally loading said disk cassette; and wherein a first urging means (37) for urging the cassette withdrawing means (33) rotates the cassette withdrawing means (33) in a direction for engaging an engaging portion (36) of the cassette withdrawing means (33) with an engaged portion (6) of the disk cassette (1);

the pivot (32) driven by the driving means (24) is moved in a direction for withdrawing the inserted disk cassette (1) so as to automatically withdraw the disk cassette (1) into the predetermined position after the engaging portion (36) of the cassette withdrawing means (33) is engaged with the engaged portion (6) of the disk cassette (1) during normal loading of said disk cassette; and further including disengaging means (39) for disengaging the engaging portion (36) of the cassette withdrawing means (33) from the engaged portion (6) of the disk cassette (1) so that said disk cassette can be drawn out from the disk-loading mechanism even after said engaging portion (36) is engaged with said engaged portion (6) during normal loading, wherein said disengaged means is provided so as to rotate the cassette withdrawing means (33) against the force of the first urging means (37) by a force exerted on the cassette withdrawing means (33) when the disk cassette (1) is drawn in opposition to the direction for withdrawing the inserted disk cassette (1) after the engaging portion (36) of the cassette withdrawing means (33) is engaged with the engaged portion (6) of the disk cassette (1); wherein:

the driving means (24) is so provided as to be rotatable on a shaft (28);

second urging means (29) for rotatively urging the driving means (24) is provided to move the pivot (32) in the direction for withdrawing the disk cassette (1);

locking means (40) is provided to lock the driving means (24) in a position from which the driving means (24) begins to withdraw the cassette withdrawing means (33); and when the driving means (24) is unlocked, the pivot (32), which is integral with the driving means (24), is moved in the direction for withdrawing the disk cassette due to force of the second urging means (29).

2. A disk cassette loading mechanism according to claim 1, wherein the disk cassette (1) is engaged with the cassette withdrawing means (33), and substantially at the same time, the driving means (24) is unlocked due to motion of the locking means (40), which is caused by a push given by the inserted disk cassette (1).

3. A disk cassette loading mechanism according to claim 1, wherein shutter opening and shutting means (19) is provided to open a shutter (3), which is secured to the disk cassette (1), as the disk cassette (1) is inserted into the mechanism, and during ejection of the disk cassette (1), to shut the shutter (3) on the one hand and push out the disk cassette (1) on the other hand, and substantially at the same time when the engaged portion (6) of the disk cassette (1) is engaged with the engaging portion (36) of the cassette withdrawing means (33), the locking means (40) is moved by the shutter opening and shutting means (19) in a direction for unlocking the drive means (24).

4. A disk cassette loading mechanism comprising:

a cassette withdrawing means (33) for engaging at least a portion of an inserted disk cassette (1) and for withdrawing it automatically into a predetermined position, wherein the cassette withdrawing means (33) for normally unloading said cassette from said mechanism and withdrawing said disk cassette during loading is so provided as to be rotatable on a pivot (32) which is provided in a driving means (24) for driving said withdrawing means for normally loading said disk cassette; and wherein a first urging means (37) for urging the cassette withdrawing means (33) rotates the cassette withdrawing means (33) in a direction for engaging an engaging portion (36) of the cassette withdrawing means (33) with an engaged portion (6) of the disk cassette (1);

the pivot (32) driven by the driving means (24) is moved in a direction for withdrawing the inserted disk cassette (1) so as to automatically withdraw the disk cassette (1) into the predetermined position after the engaging portion (36) of the cassette withdrawing means (33) is engaged with the engaged portion (6) of the disk cassette (1) during normal loading of said disk cassette; and further including disengaging means (39) for disengaging the engaging portion (36) of the cassette withdrawing means (33) from the engaged portion (6) of the disk cassette (1) so that said disk cassette can be drawn out from the disk-loading mechanism even after said engaging portion (36) is engaged with said engaged portion (6) during normal loading, wherein said disengaged means is provided so as to rotate the cassette withdrawing means (33) against the force of the first urging means (37) by a force exerted on the cassette withdrawing means (33) when the disk cassette (1) is drawn in opposition to the direction for withdrawing the inserted disk cassette (1) after the engaging portion (36) of the cassette withdrawing means (33) is engaged with the engaged portion (6) of the disk cassette (1);

wherein said cassette withdrawing means (33) is a cassette withdrawing arm, said engaging portion (36) is a convex tip of said arm, said engaged portion (6) is a recess in said disk cassette; and said driving means (24) drives a cassette withdrawing lever rotated in a first direction against a force of a tension spring (29) until a projection (35) of the cassette withdrawing arm (33) abuts against a stop (39) whereupon the cassette withdrawing arm (33) is rotated counterclockwise against the force of a tension spring (37) to disengage the convex tip of the cassette withdrawing arm (33) from the recess (6) of the disk cassette.

* * * * *